April 12, 1960  E. L. CHILDERS  2,932,058
APPARATUS FOR SEPARATING MEAT FROM BONE
Filed Nov. 7, 1957  3 Sheets-Sheet 1

INVENTOR
Earl L. Childers

BY Mason, Fenwick & Lawrence
ATTORNEYS

April 12, 1960 E. L. CHILDERS 2,932,058
APPARATUS FOR SEPARATING MEAT FROM BONE
Filed Nov. 7, 1957 3 Sheets-Sheet 2
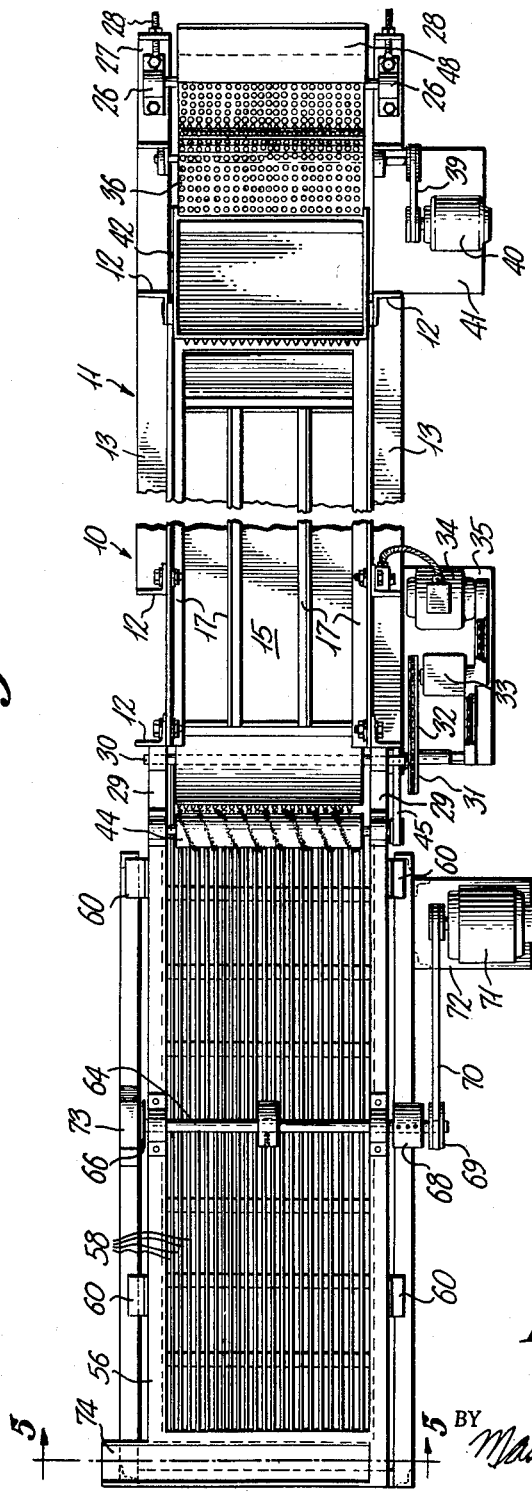
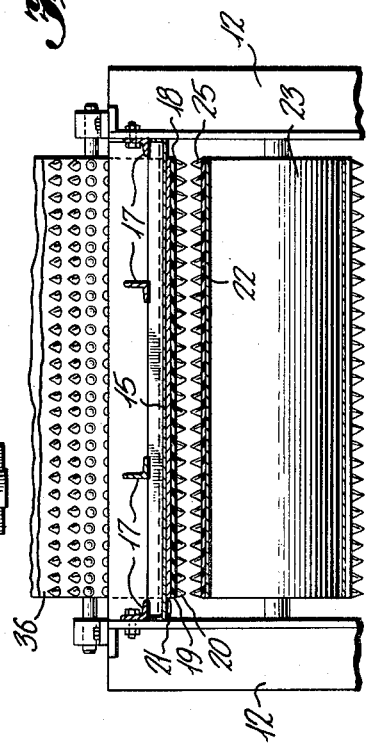
INVENTOR
*Earl L. Childers*
BY *Mason, Fenwick & Lawrence*
ATTORNEYS April 12, 1960 E. L. CHILDERS 2,932,058
APPARATUS FOR SEPARATING MEAT FROM BONE
Filed Nov. 7, 1957 3 Sheets-Sheet 3

INVENTOR
*Earl L. Childers*
BY *Mason, Fenwick & Lawrence*
ATTORNEYS

2,932,058
APPARATUS FOR SEPARATING MEAT FROM BONE

Earl L. Childers, Bedford, Va.

Application November 7, 1957, Serial No. 694,973

3 Claims. (Cl. 17—1)

The present invention relates in general to apparatus for separating relatively soft substances from relatively hard substances, and more particularly to apparatus for separating meat from chicken bones such as the neck, wing, back and other similar pieces.

Heretofore, it has been recognized that the bony pieces of chicken such as the chicken necks, backs and wings would represent a source of supply for a substantial quantity of meat of appropriate quality for use in chicken salad, chicken croquettes, chicken pies, spreads and the like. However, taking the meat from such bony chicken pieces by hand would involve such labor costs that the over-all cost of supplying the meat from such sources would be prohibitive. Accordingly, these pieces of chicken were frequently classified as throw-away items.

An object of the present invention is the provision of apparatus for separating means from bones and the like in a rapid, unique and economical manner and under circumstances which will satisfy the rigid requirements of sanitary laws.

Another object of the present invention is the provision of novel apparatus for separating means from chicken bones such as chicken necks, back and wings, to make poultry meat available from such sources for use in salads, spreads, croquettes, pies, and the like.

Another object of the present invention is the provision of novel apparatus for separating meat from chicken bones which is capable of effecting the separation rapidly by a substantially continuous feed process.

Other objects, advantages and capabilities of the present invention will become apparent from the following detail description, taken in conjunction with the accompanying drawings, illustrating one preferred embodiment of the invention.

In the drawings:

Figure 2 is a top plan view of the machine;

Figure 3 is a fragmentary vertical transverse section view taken along the line 3—3 of Figure 1;

Figure 1:
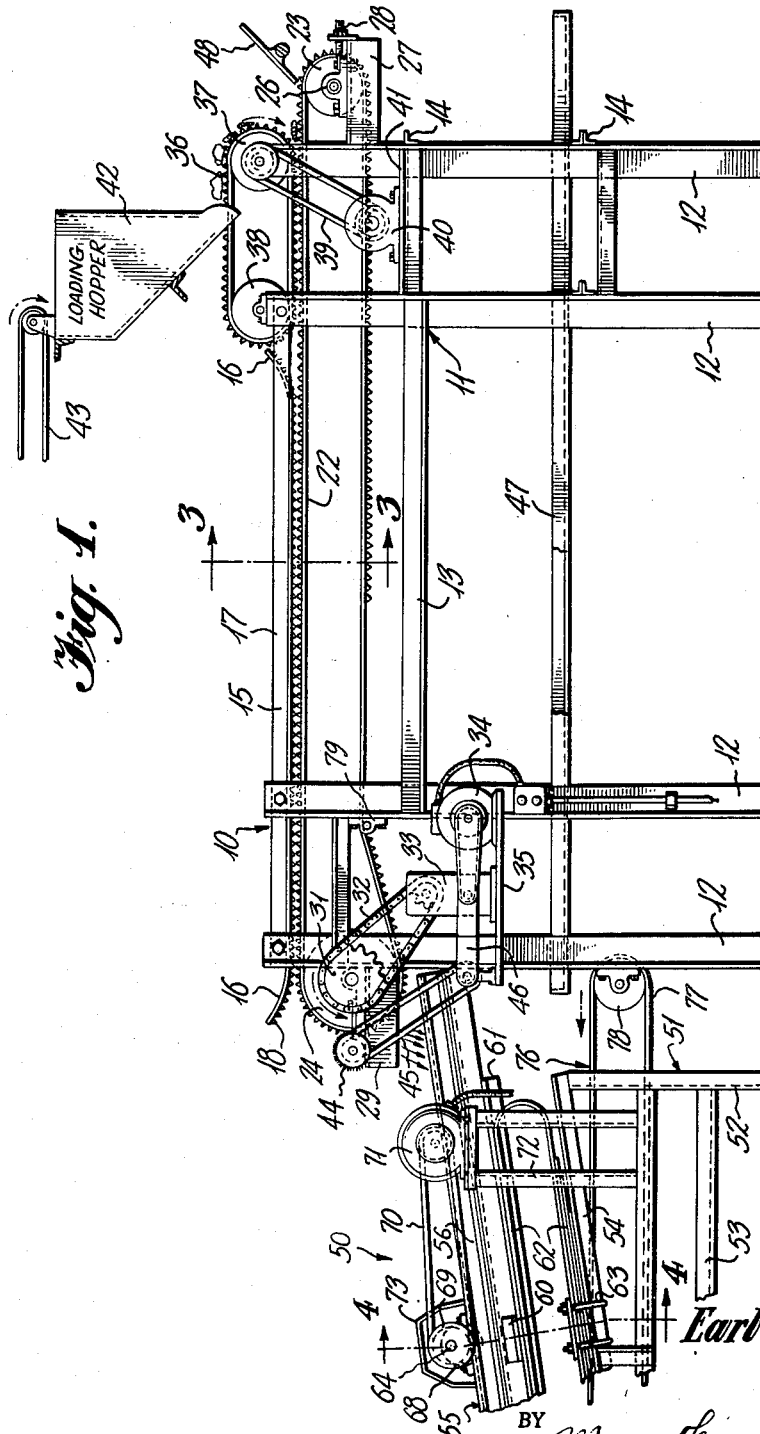
Figure 1 is a side elevation of a machine embodying the present invention for separating meat from chicken bones.
Figure 4:
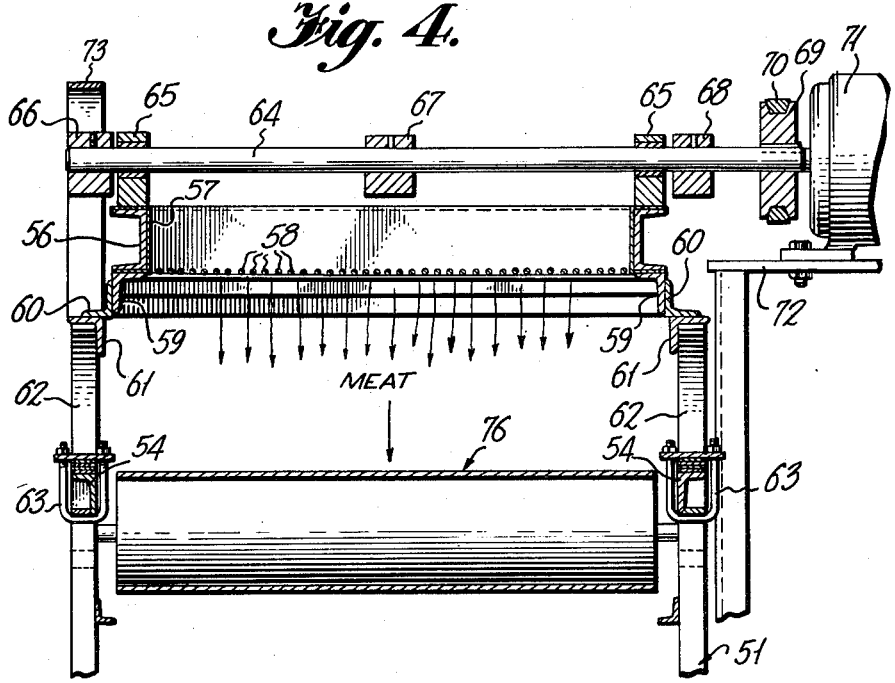
Figure 4 is a vertical transverse section view taken along the line 4—4 of Figure 1.
Figure 5:
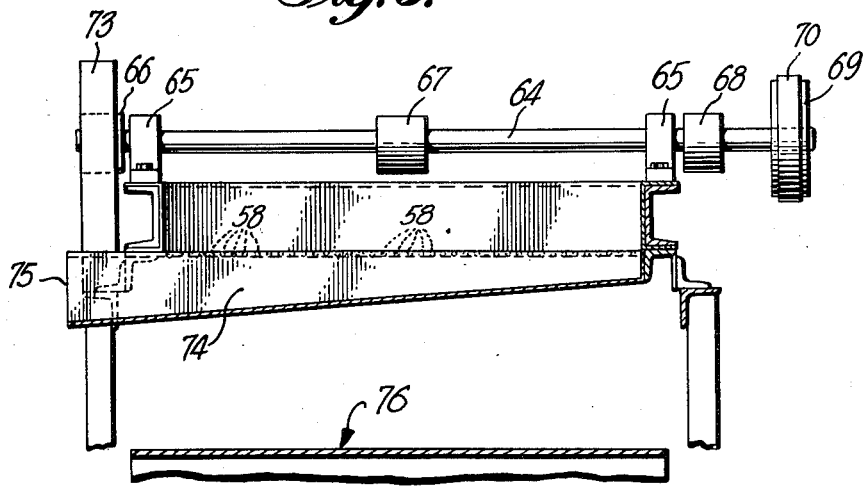
Figure 5 is a vertical transverse section view taken along the line 5—5 of Figure 2.

Referring to the drawings, wherein like reference characters designate the corresponding parts throughout the several figures, the apparatus embodying the present invention, indicated generally by the reference character 10, comprises a main frame 11 formed of a plurality of upright frame members 12, longitudinal frame members 13 and cross braces 14, which are preferably formed of angle irons. Supported in horizontal position at the upper ends of a plurality of the upright frame members 12 is a sheet metal platen 15 having upwardly curved entrance and exit ends 16 and extending substantially the width of the main frame 11. The sheet metal platen 15 is backed by a reinforcing frame 17 of angle iron members which are bolted or otherwise rigidly affixed to the upright frame members 12. The underface of the sheet metal platen 15 has cemented or otherwise affixed thereto a fixed scouring belt 18 preferably formed of a neoprene body 19 having a plurality of integral neoprene cones 20 projecting therefrom aligned in longitudinal and transverse rows, the body 19 being backed by a canvass backing 21. It will be understood that the belt may be made of other flexible synthetic rubber or plastic materials suitable for molding to form a belt having integral cones projecting therefrom.

An endless scouring belt 22 is supported on drums 23 and 24 positioned at the right and left, respectively, of the main frame 11, as viewed in Figure 1, and has an upper flight lying immediately below the fixed scouring belt 18, the endless belt 22 being of the same construction as the fixed belt 18 and having cones 25 thereon preferably projecting to within approximately 1/16" of the tips of the cones 20 on the fixed belt 18. The drum 23 is journalled in suitable bearing brackets 26 carried by a supporting frame 27 fixed to the main frame 11. The bearing brackets 26 are rendered adjustable by suitable adjusting screws 28 of conventional construction for effecting fine adjustment of the tension belt 22.

The drum 24 is also journalled in conventional bearing brackets carried by a supporting frame 29 affixed to the main frame 11. The shaft 30 of the drum 24 has fixed thereto a sprocket 31 coupled by a chain 32 with an output sprocket of a gear reduction box 33 driven by a motor 34. The gear reduction box 33 and motor 34 are supported on a shelf 35 projecting laterally from the main frame 11 and carried by the upright frame members 12.

An endless transfer belt 36 supported on drums 37 and 38 is disposed above the endless belt 22 adjacent the feed end thereof (lying to the right as viewed in Figure 1), the transfer belt 36 being of similar construction to the belts 18 and 22. The drum 37 is driven through a belt 39 by a motor 40 supported on a shelf 41 extending laterally from the main frame 11.

A loading hopper 42 is supported above the transfer belt 36 to discharge the pieces of chicken onto the transfer belt 36, and receive the pieces of chicken from an endless conveyor belt 43 of conventional construction. The purpose of the transfer belt 36 is primarily to prepare the chicken necks and backs for the trip through the separating apparatus between the fixed and movable belts 18 and 22 by breaking up the larger pieces between the lower flight of the transfer belt 36 and the upper flight of the endless belt 22. It is apparent that a single crushing roller disposed approximately in the position of either the drums 37 or 38 may be substituted for the transfer belt 36 and the loading hopper repositioned to discharge the pieces of chicken onto the belt 22 to the right of the crushing roller to effect substantially comparable preparation of the neck and back pieces for passage between the fixed belt 18 and movable belt 22.

A rotary brush drum 44 is also journalled on the supporting frame 29 and in contact with the working surface of the movable belt 22 in substantially horizontal alignment with the axis of the drum 24 to brush the particles of chicken meat which may be caught between the cones 25 on the belt 22. The brush drum 44 is driven at a higher rate of speed than the drum 24 by means of a belt 45 driven through a belt and pulley mechanism 46 driven from the output shaft of the motor 34.

Supported on the main frame 11 in a substantially horizontal position spaced below the scouring belts 18 and 22 and extending substantially the length of the scouring belts is a spill tray 47. The spill tray rests loosely on a plurality of cross braces 14 extending between the upright legs 12 and is of greater width than the scouring belts 18 and 22 to project below each edge of the belts and receive material which spills laterally off the belts. Preferably, an inclined guard plate 48 is also provided above the drum 23 at the feed end of the belt 22 to prevent loss of material being transferred from the transfer belt 36 to the belt 22.

A vibratory unit, indicated generally by the reference character 50, is disposed at the discharge end of the main frame 11 in longitudinal alignment with the main frame and comprises a supporting frame 51 having upright legs 52, horizontal, longitudinal frame members 53 and a pair of inclined angle iron members 54 inclining upwardly toward the discharge end of the main frame 11. The vibratory grating 55 is resiliently supported above the supporting frame 51 and includes a rectangular frame 56 of channel-shaped members having their flanges facing outwardly and faced by stainless steel covers 57, and longitudinal small-gauge rods 58 extending parallel to each other between the ends of the frame 56 and spaced closely together to form the grating surface. An angle iron member 59 is affixed to the rectangular frame 56 beneath the longitudinal channel members forming the sides of the frame 56 by welding or otherwise securing one of the flanges of each of the angle iron members 59 to the lower flange portion of the side channel members of the frame 56 and a plurality of longitudinally spaced short angle iron sections 60 having their horizontal flanges projecting oppositely outwardly relative to the rectangular frame 56 are welded to the vertical flanges of members 59 and to laterally spaced longitudinal angle iron members 61. The horizontal flange of the angle iron member 61 at each side of the frame 56 is bolted or otherwise removably secured to the upper reach of a U-shaped spring strap 62, a spring strap 62 being provided at each side of the rectangular grating frame 56. The lower leg of each of the spring straps 62 is clamped by a U-bolt clamp 63 to the inclined angle iron members 54 at the top of the frame 51 for the vibratory unit 50. In this way, the vibratory grating unit 50 is resiliently supported for vibration above the supporting frame 51.

A transverse shaft 64 is journalled in bearing blocks 65 projecting upwardly from the side channel members of the rectangular frame 56. Eccentric blocks 66, 67 and 68 are adjustably fixed to the shaft 64, as by set screws or the like, to rotate with the shaft 64, and a pulley 69 is keyed to one end of the shaft 64 to be driven by a belt 70 trained around the pulley 69 and around the output shaft pulley of a motor 71 mounted on an elevated platform 72 on the supporting frame 51. A sheet metal shield 73 may be provided to extend about the eccentric block 66. The rectangular frame 56 carries a transverse chute 74 formed of sheet metal or the like and opening laterally of the frame 56 as indicated at 75, the chute 74 extending below the plane of the rods 58 forming the grating surface and being in open communication with the working surface of the network of rods 58 at the lower end of the grating to receive the material retained within the frame 56 by the rods 58 upon vibration thereof, fed by gravity to the chute 74 and discharged laterally of the vibratory unit 50. A suitable endless belt conveyor 76 includes a belt 77 of conventional form and drum 78 extends below the grating frame 56 over the entire length thereof to continuously convey the material which passes between the network of rods 58 away from the apparatus to an inspection table or the like. Obviously, trays or like receptacles designed to be manually transported may be substituted for the endless conveyor 76, if desired.

In the operation of the apparatus, assuming it is to be employed to separate meat from chicken bones by operating upon chicken backs, chicken necks and chicken wings, the pieces of chicken may be deposited in the loading hopper 42 by the endless conveyor 43 and delivered by gravity from the discharge end of the hopper 42 to the upper flight of the transfer belt 36. These pieces are carried toward the feed end of the main frame 11 and downwardly onto the continuously driven scouring belt 22 in the area between the drum 37 and inclined plate 48. The continuously driven belt 22 will have been adjusted for proper tension by positioning the adjustable tension roller 79 engaging a lower flight of the belt 22 and by adjusting the adjusting screws 28 positioning the bearing brackets 26 for the drum 23, and the lower flight of the transfer belt 36 will be so positioned relative to the upper flight of the belt 22 as to break up the larger pieces of chicken deposited on the belt 22. The pieces of chicken then pass below the fixed scouring belt 18. The rubbing action produced by the cones 20 and 25 on the fixed scouring belt 18 and endless belt 22 effectively rub or scour the meat from the bones. The material then is discharged onto the grating 55 at the upper end of the grating disposed below the drum 24. Complete discharge of the material from the belt 22 is effected by the rubbing action of the brush drum 44. The grating 55 is undergoing vibration through the action of the eccentric blocks 66, 67 and 68 on the shaft 64 driven by the motor 71, and the spacing of the rods 58 is such that only the finely shredded meat passes between the rods and onto the discharge conveyor belt 77 and the bone is retained by the rods 58. The bones are gravity fed to the lower end of the screen 55 remote from the main frame 11 and drop into the chute 74 where they are discharged laterally through the opening 75 into any desired collection facility.

It will be apparent that the removal of the meat from the chicken bones is effected by the rubbing action of the cones 20 and 25 on the belts 18 and 22, one of which is movable relative to the other. While in the preferred embodiment, the belt 18 is fixed and the belt 22 is movable, it will be apparent that comparable action can be obtained by making both belts movable at different rates of speed so that there is relative motion between them.

By the apparatus described above, it has become possible to effectively separate meat from chicken bones of the type described in a practical and economical manner under conditions which satisfy the sanitary codes applicable to food processing, and produces chicken meat which has been separated from the bone of a quality suitable for the by-product market. That is to say, the meat produced by this apparatus is thoroughly suitable for use in chicken salads, spreads, croquettes, pies, and the like. While the particular pieces of chicken which this apparatus is designed to operate upon have been largely classified as throw-away items in the mass production food processing field, the present apparatus provides a practical facility for processing these pieces in a manner which renders them an economical source of chicken meat. The use of flexible material for the scouring belts 18 and 22 and merely passing the pieces of chicken between them with relative motion between the belts avoids separation of bone chips and portions of bone from the pieces to insure that bone chips and small pieces of bone which could not be grated out by the grating 55 are not present in the scoured material deposited onto the grating.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and set forth in the appended claims.

I claim:

1. Apparatus for recovering meat from the bones of cooked chicken pieces such as necks, backs, wings and the like comprising a frame, an upper, elongated fixed belt member mounted on said frame having a substantially horizontal, downwardly facing, working surface including a network of flexible depending pointed projections extending over the area of said working surface, a driven elongated endless belt member having a network of like flexible pointed projections extending over the area thereof, said driven belt member having an upper reach of greater longitudinal extent than said upper fixed belt member substantially paralleling and lying in close juxtaposition to said working surface of said fixed belt member, said upper reach having a feed end and a discharge end, said fixed and driven belt members being disposed longitudinally in vertical alignment with each other with the adjacent portions thereof forming an elongated working passage therebetween for movement of the pieces of chicken therethrough, and means adjacent the feed end of said upper reach for depositing the cooked chicken pieces on said upper flight of said driven belt to be carried by said driven belt between said working surface and said upper flight to cause said projections to rub the meat from the chicken pieces.

2. Apparatus for recovering meat from the bones of cooked chicken pieces such as necks, backs and wings comprising a frame, a driven endless belt member passing about drums on said frame and having a substantially horizontal, elongated upper flight, said belt member having a network of closely spaced flexible conical projections of resiliently deformable material extending over the area thereof and projecting upwardly from said upper flight, said upper flight having a feed end and a discharge end, a fixed platen supported on said frame above said upper flight, a second belt member underlying and bearing against the lower face of said fixed platen disposed substantially horizontally and extending over the major portion of said upper flight intermediate said feed end and discharge end, said second belt member having a network of downwardly extending flexible conical projections of resiliently deformable material over the area thereof lying in close juxtaposition to said upper flight, means for causing said driven belt member to move relative to said second belt member, and means adjacent the feed end of said upper flight for depositing the cooked chicken pieces on an upwardly facing portion of said upper flight at the feed and thereof for delivery by said driven belt between said upper flight and said second belt member, said flexible conical projections of the adjacent portions of said belt members projecting into close proximity to each other to rub the meat from said cooked chicken pieces passing therebetween.

3. Apparatus for recovering meat from the bones of cooked chicken pieces such as necks, backs and wings comprising a frame, a driven endless belt member passing about drums on said frame and having a substantially horizontal, elongated upper flight, said belt member having a network of closely spaced flexible conical projections of resiliently deformable material extending over the area thereof and projecting upwardly from said upper flight, said upper flight having a feed end and a discharge end, a fixed platen supported on said frame above said upper flight, an upper belt member underlying and bearing against the lower face of said fixed platen disposed substantially horizontally and extending over the major portion of said upper flight intermediate said feed end and discharge end, said upper belt member having a network of downwardly extending flexible conical projections of resiliently deformable material over the area thereof lying in close juxtaposition to said upper flight, means for causing said driven belt member to move relative to said upper belt member, a second driven endless belt member supported by said frame above said first-mentioned driven belt member having horizontal upper and lower flights, said second belt member having a network of flexible conical projections extending over the area thereof and the lower flight thereof being in close juxtaposition to said upper flight of said first-mentioned belt member at the feed end thereof, and means adjacent and overlying the upper flight of said second driven belt member for depositing the cooked chicken pieces on the upper flight of said second driven belt member for transfer to the upper flight of said first-mentioned driven belt member, said first and second driven belt members being positioned to dispose the adjacent flights thereof in close proximity to break up large chicken pieces passed therebetween.

References Cited in the file of this patent

UNITED STATES PATENTS

| | | |
|---|---|---|
| 2,433,730 | Bridge | Dec. 30, 1947 |
| 2,480,357 | Cole et al. | Aug. 30, 1949 |
| 2,761,479 | Geisler et al. | Sept. 4, 1956 |
| 2,798,251 | Lott | July 9, 1957 |